United States Patent [19]
Thundat et al.

[11] Patent Number: 6,118,124
[45] Date of Patent: *Sep. 12, 2000

[54] ELECTROMAGNETIC AND NUCLEAR RADIATION DETECTOR USING MICROMECHANICAL SENSORS

[75] Inventors: Thomas G. Thundat; Robert J. Warmack, both of Knoxville; Eric A. Wachter, Oak Ridge, all of Tenn.

[73] Assignee: Lockheed Martin Energy Research Corporation, Oak Ridge, Tenn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/588,484

[22] Filed: Jan. 18, 1996

[51] Int. Cl.$^7$ ........................................................ G01J 5/34
[52] U.S. Cl. ........................................ 250/332; 250/338.1
[58] Field of Search ............................. 250/336.1, 338.1, 250/332, 338.4

[56] References Cited

U.S. PATENT DOCUMENTS

| | | |
|---|---|---|
| Re. 35,544 | 7/1997 | Snow . |
| 3,415,712 | 12/1968 | Barker, Jr. ................................ 374/205 |
| 3,896,309 | 7/1975 | Halsor et al. ....................... 250/370.14 |
| 4,236,893 | 12/1980 | Rice . |
| 4,242,096 | 12/1980 | Oliveira et al. . |
| 4,427,881 | 1/1984 | Ruell . |
| 4,596,697 | 6/1986 | Ballato . |
| 4,637,987 | 1/1987 | Minten et al. . |
| 4,735,906 | 4/1988 | Bastiaans . |
| 4,762,426 | 8/1988 | Foss ........................................ 250/226 |
| 4,847,193 | 7/1989 | Richards et al. . |
| 4,905,701 | 3/1990 | Cornelius . |
| 4,906,840 | 3/1990 | Zdeblick et al. . |
| 4,999,284 | 3/1991 | Ward et al. . |
| 5,001,053 | 3/1991 | Takahashi et al. . |
| 5,130,257 | 7/1992 | Baer et al. . |
| 5,135,852 | 8/1992 | Ebersole et al. . |
| 5,144,833 | 9/1992 | Amer et al. ............................. 250/306 |
| 5,156,972 | 10/1992 | Issachar . |

(List continued on next page.)

OTHER PUBLICATIONS

"Microfabrication of Cantilever Styli for the Atomic Force Microscope" by T.R. Albrecht, S. Akamine, T.E. Carver and C. F. Quate, Journal of Vacuum Science & Technology A, vol. 8, No. 4, Jul./Aug. 1990, pp. 3386–3396.

"A Mechanical Nanosensor in the Gigahertz Range: Where Mechanics Meets Electronics", by Vu Thien Binh, N. Garcia, A. L. Levanuyk, Surface Sciences, vol. 301, Nos. 1–3, Jan. 10, 1994, pp. 1224–1228.

"A Nondestructive Method for Determining the Spring Constant of Cantilevers for Scanning Force Microscopy" by J. P. Cleveland and S. Manne, D. Bocek, P. K. Hansma, Review of Scientific Instruments, vol. 64, No. 2, Feb. 1993, pp. 403–405.

"Adhesion Forces Between Individual Ligand–Receptor Pairs" by Ernst–Ludwig Florin, Vincent T. Moy, Hermann E. Gaub, Science, vol. 264, Apr. 15, 1994, pp. 415–417.

(List continued on next page.)

*Primary Examiner*—Edward P. Westin
*Assistant Examiner*—Richard Hanig
*Attorney, Agent, or Firm*—Jones & Askew, LLP

[57] ABSTRACT

Electromagnetic and nuclear radiation is detected by micromechanical sensors that can be coated with various interactive materials. As the micromechanical sensors absorb radiation, the sensors bend and/or undergo a shift in resonance characteristics. The bending and resonance changes are detected with high sensitivity by any of several detection methods including optical, capacitive, and piezoresistive methods. Wide bands of the electromagnetic spectrum can be imaged with picoJoule sensitivity, and specific absorptive coatings can be used for selective sensitivity in specific wavelength bands. Microcantilevers coated with optical cross-linking polymers are useful as integrating optical radiation dosimeters. Nuclear radiation dosimetry is possible by fabricating cantilevers from materials that are sensitive to various nuclear particles or radiation. Upon exposure to radiation, the cantilever bends due to stress and its resonance frequency shifts due to changes in elastic properties, based on cantilever shape and properties of the coating.

27 Claims, 9 Drawing Sheets

U.S. PATENT DOCUMENTS

| | | |
|---|---|---|
| 5,179,028 | 1/1993 | Vali et al. . |
| 5,221,415 | 6/1993 | Albrecht et al. . |
| 5,245,863 | 9/1993 | Kajimura et al. ............ 250/306 |
| 5,283,087 | 2/1994 | Baer et al. . |
| 5,306,644 | 4/1994 | Myerholtz et al. . |
| 5,323,636 | 6/1994 | McGowan et al. . |
| 5,339,675 | 8/1994 | DiLeo et al. . |
| 5,345,816 | 9/1994 | Clabes et al. ............ 250/306 |
| 5,347,226 | 9/1994 | Bachmann et al. . |
| 5,363,697 | 11/1994 | Nakagawa . |
| 5,372,930 | 12/1994 | Colton et al. . |
| 5,411,709 | 5/1995 | Furuki et al. . |
| 5,445,008 | 8/1995 | Wachter et al. . |
| 5,445,970 | 8/1995 | Rohr . |
| 5,445,971 | 8/1995 | Rohr . |
| 5,477,716 | 12/1995 | Snow . |
| 5,482,678 | 1/1996 | Sittler . |
| 5,494,639 | 2/1996 | Grzegorzewski . |
| 5,501,986 | 3/1996 | Ward et al. . |
| 5,550,516 | 8/1996 | Burns et al. . |
| 5,552,274 | 9/1996 | Oyama et al. . |
| 5,595,908 | 1/1997 | Fawcett et al. . |
| 5,620,854 | 4/1997 | Holzrichter et al. . |
| 5,658,732 | 8/1997 | Ebersole et al. . |
| 5,705,399 | 1/1998 | Larue . |
| 5,719,324 | 2/1998 | Thundat et al. . |
| 5,763,768 | 6/1998 | Henderson et al. . |
| 5,844,238 | 12/1998 | Sauer et al. . |
| 5,866,328 | 2/1999 | Bensimon et al. . |

OTHER PUBLICATIONS

"Measuring Intermolecular Binding Forces with the Atomic–Force Microscope: The Magnetic Jump Method" by Jan H. Hoh, Paul E. Hillner and Paul K. Hansma, Fifty–Second Annual Meeting Microscopy Society of America, Twenty–Ninth Annual Meeting Microbeam Analysis Society, 31 Jul.–5 Aug. 1994, pp. 1054–1055.

"Quantized Adhesion Detected with the Atomic Force Microscope" by Jan H. Hoh, Jason P. Cleveland, Craig B. Prater, Jean–Paul Revel and Paul K, Hansma, Journal of the American Chemical Society, vol. 114, No. 12, Jun. 3, 1992, pp. 4917–4918.

"Sensing Discrete Streptavidin–Biotin Interactions with Atomic Force Microscopy" by Gil U. Lee, David A. Kidwell, and Richard J. Colton, Langmuir, vol. 10, No. 2, Feb. 1994, pp. 354–357.

J.R. Barnes et al., "Photothermal spectroscopy with femtojoule sensitivity using a micromechanical device", *Nature*, vol. 372, Nov. 3, 1994, pp. 79–81.

"Responsive Gels: Volume Transitions I", edited by K. Dusek with contributions by M. Havsky, H. Inomata, A. Khokhlov, M. Konno, A. Onuki, S. Saito, M. Shibayama, R.A. Siegel, S. Starodubtzev, T. Tanaka, V.V. Vasiliveskaya. Springer–Verlag Berlin Heidelberg New York London Paris Tokyo Hong Kong Barcelona Budapest.

"Thermal and ambient–induced deflections of a scanning force microscope cantilevers" by T. Thundat, R.J. Warmack, G.Y. Chen and D.P. Allison, Appl. Phys. Lett., vol. 64, No. 21, May 23, 1994, pp. 2894–2896.

Sensors The Journal of Applied Sensing Technology, vol. 11 No. 5 May 1994, pp. 8–9.

"Optical and Infrared Detectors" edited by R.J. Keyes with contributions by R.J. Keyes, P.W. Kruse, D. Long, A.F. Milton, E.H. Putley, M.C. Teich and H.R. Zwicker, Springer–Verlag Berlin Heidelberg New York 1977, pp. 71–100.

"Observation of a chemical reaction using a micromechanical sensor" by J.K. Gimzewski, Ch. Gerber, E. Meyer and R.R. Schlittler, Chemical Physics Letters, vol. 217, No. 5.6, Jan. 28, 1994, pp. 589–594.

ELECTROMAGNETIC AND NUCLEAR RADIATION DETECTOR USING MICROMECHANICAL SENSORS

This invention was made with Government support under contract DE-AC05-84OR21400 awarded by the U.S. Department of Energy to Lockheed Martin Energy Systems, Inc. and the Government has certain rights in this invention.

FIELD OF THE INVENTION

The present invention relates generally to the field of measuring and testing, and more specifically, to the detection of nuclear and electromagnetic radiation using micromechanical sensors.

BACKGROUND OF THE INVENTION

The detection of electromagnetic and nuclear radiation has extensive commercial applications. A variety of detectors including photomultipliers, thermopiles, scintillation devices and solid state detectors are currently used. For example, the thermopile type of detector has a very broad band response since it is based upon thermal conversion of energy absorbed. Unfortunately, this type of detector generally has a slow response time and cannot reasonably be manufactured as two-dimensional array detectors. Solid state detectors for the infrared region are based on semiconductor effects. This generally requires the device to be kept at a cryogenic temperature to reduce thermal activation.

A technique that can detect infrared radiation without requiring temperature control, and that has broadband sensitivity and can be made into two dimensional arrays, would have immediate relevance in a variety of industries, such as: aerospace, military and civilian surveillance, industrial monitoring, night vision systems, and collision avoidance systems.

Similar advantages can be stated for nuclear radiation detectors using micromechanical sensors. Uncooled, integrating detectors having single or arrayed detector elements that respond to absorbed nuclear radiation would have immediate applications in health physics monitoring, mixed waste radiation, environmental monitoring and field screening.

Recently there has been a growth of interest in micromechanical sensors. Micromechanical sensors can consist of any of a class of suspended mass devices, such as microcantilever beams supported at one or multiple points, or suspended about their perimeter. For example, microcantilevers coated with metal on one side undergo bending due to differential thermal expansion of the coating metal and the coated cantilever (the "bimetallic effect"). Bending due to the bimetallic effect has been used for calorimetric detection of chemical reactions with picoJoule (pJ) sensitivity.

U.S. Pat. No. 5,445,008 to Wachter et al. describes microbar sensors which employ microcantilevers oscillated by a piezoelectric transducer. A coating on the beam selectively adsorbs a target chemical, and accumulation of the chemical is manifest in a change of resonant frequency of the beam. This patent is incorporated herein by reference.

U.S. Pat. No. 5,144,833 to Amer et al. describes an atomic force microscope that employs micromachined cantilevers. As a tip mounted on the cantilever moves over a surface, interatomic forces between the tip and the surface induce displacement of the tip.

U.S. Pat. No. 5,245,863 to Kajimura et al. describes another atomic force microscope in which a cantilever is fixed to a piezoelectric element. A semiconductor laser constitutes a Fabry-Perot resonator between a mirror and a reflection cleavage plane. The resonator output varies in accordance with displacement of the cantilever.

U.S. Pat. No. 5,347,226 to Bachmann describes an array spreading resistance probe which uses a microcantilever. A probe tip is formed in openings in the distal end of the cantilever. The probe tips are used to obtain impurity profiles of semiconductors.

U.S. Pat. No. 5,345,816 to Clabes et al. describes an integrated tip strain sensor for use in an atomic force microscope. The tip is formed by electron beam deposition.

The references noted above do not provide methods or devices for measuring atomic or electromagnetic radiations.

SUMMARY OF THE INVENTION

An object of the present invention is to provide a detector which is capable of detecting a broad range of electromagnetic and nuclear radiations.

Another object of the present invention is to provide a detector which is capable of detecting electromagnetic and nuclear radiations with picoJoule sensitivity.

Still another object of the present invention is to provide a radiation detector which exhibits relatively fast response times.

Another object of the invention is to provide microcantilevers that are fabricated from materials that respond to impinging nuclear radiation that causes a change in mechanical properties of the microcantilever. This response is the result of radiation damage in the microcantilever or in an applied coating on the microcantilever. Sensitizing materials can include various polymeric chemicals and solid state materials that absorb nuclear radiation, such as crystalline silicon.

These and other objects of the invention are met by providing a method and apparatus for detecting electromagnetic and nuclear radiation which includes exposing a cantilever to radiation, the cantilever having at least one physical parameter which varies in response to the radiation, monitoring changes in the at least one physical parameter, and correlating changes in the at least one physical parameter to the presence of a type or quantity of radiation.

An illustrative embodiment of the invention provides for detection of electromagnetic radiation using a micromechanical sensor. The micromechanical sensor comprises a microcantilever coated with one or more coating materials that react to electromagnetic radiation. As the coatings on the microcantilever absorb electromagnetic radiation, the microcantilever bends, and/or undergoes a shift in resonance frequency.

Bending shifts, and resonance frequency changes are physical properties that can be detected with high sensitivity detection methods taught herein. Such detection methods can be based on changes in optical, capacitive, electron tunnelling piezoelectric, or piezoresistive properties. A wide band of the electromagnetic spectrum can be detected to picoJoule sensitivity with one or more coated microcantilevers. Specific absorptive coatings can be used for selective sensitivity in specific wavelength bands. A micromechanical sensor assembly comprising an array of coated microcantilevers provides detection resolution comparable to CCD arrays.

In another specific embodiment of the invention, microcantilevers are coated with optical radiation sensitive polymers. The coated microcantilevers can be used as optical radiation dosimeters. Upon exposure to radiation, such a polymer-coated microcantilever bends due to internal stresses and its resonance frequency increases due to stiffening. Physical properties of the polymer-coated microcantilever radiation dosimeters are monitored to detect optical radiation based on the measured properties responding to impinging electromagnetic radiation.

Other objects, advantages, and salient features will be more apparent when considered with the following detailed description and drawing that are provided to facilitate the understanding of the subject invention without any limitation thereto.

DETAILED DESCRIPTION OF THE PREFERRED EMBODIMENTS

Figure 1:
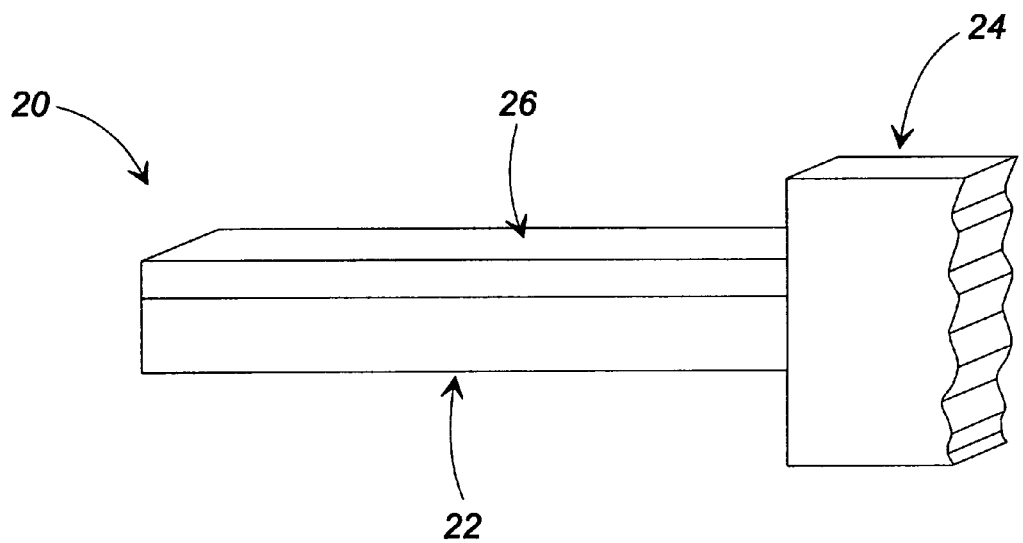
FIG. 1 is an enlarged, perspective view of a cantilever sensor capable of detecting radiation according to an embodiment of the present invention.

For a better understanding of the present invention, together with other and further objects, advantages, and capabilities thereof, reference is made to the following disclosure and to the figures of the drawing, where like reference characters designate like or similar elements. In accordance with an embodiment of the invention, radiation detection is based upon absorption of radiation to cause physical movement and changes in the mechanical resonance of a microcantilever. These changes can be sensitively detected as taught herein.

Referring to FIG. 1, a sensor according to the present invention is generally referred to by the numeral 20. The sensor 20 includes a microcantilever 22 connected at its proximal end to, and extending outwardly from, a base 24. A coating 26 is formed on one of the surfaces of the microcantilever 22.

Figure 2:
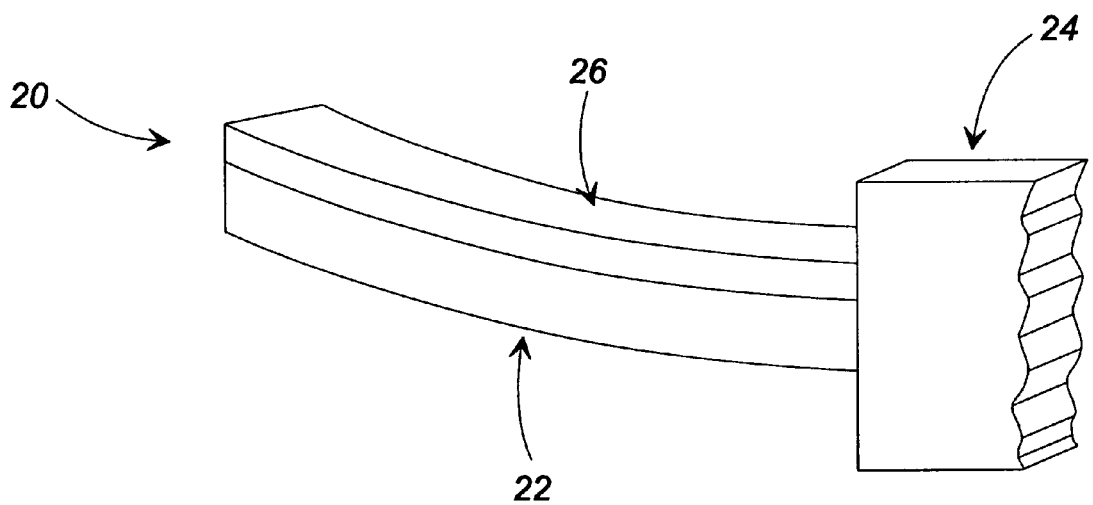
FIG. 2 is a perspective view of the cantilever depicted in FIG. 1 bending under stress.

One particular embodiment utilizes metal coated microcantilevers such as those commonly sized for atomic force microscopy (AFM), in which sub-Angstrom ($<10^{-10}$ meters) deflection sensitivity is routinely obtained. The metal-coated microcantilevers are typically 100–200 $\mu$m long, 0.3–3 $\mu$m thick and 10–30 $\mu$m wide and are made out of a variety of materials such as silicon, silicon nitride, other semiconductors, or combinations thereof. Coating a side of the microcantilever with a different material, such as the metal film 26, makes the microcantilever extremely sensitive to temperature variations due to the bimetallic effect, as previously defined. Such microcantilevers 20 undergo bending in response to temperature variations, as shown in FIG. 2. Thus, to detect infrared radiation, for example, the infrared radiation would cause heating of the sensor, and differential thermal expansion of the sensor would result in a detectable bend in the microcantilever.

Figure 3:
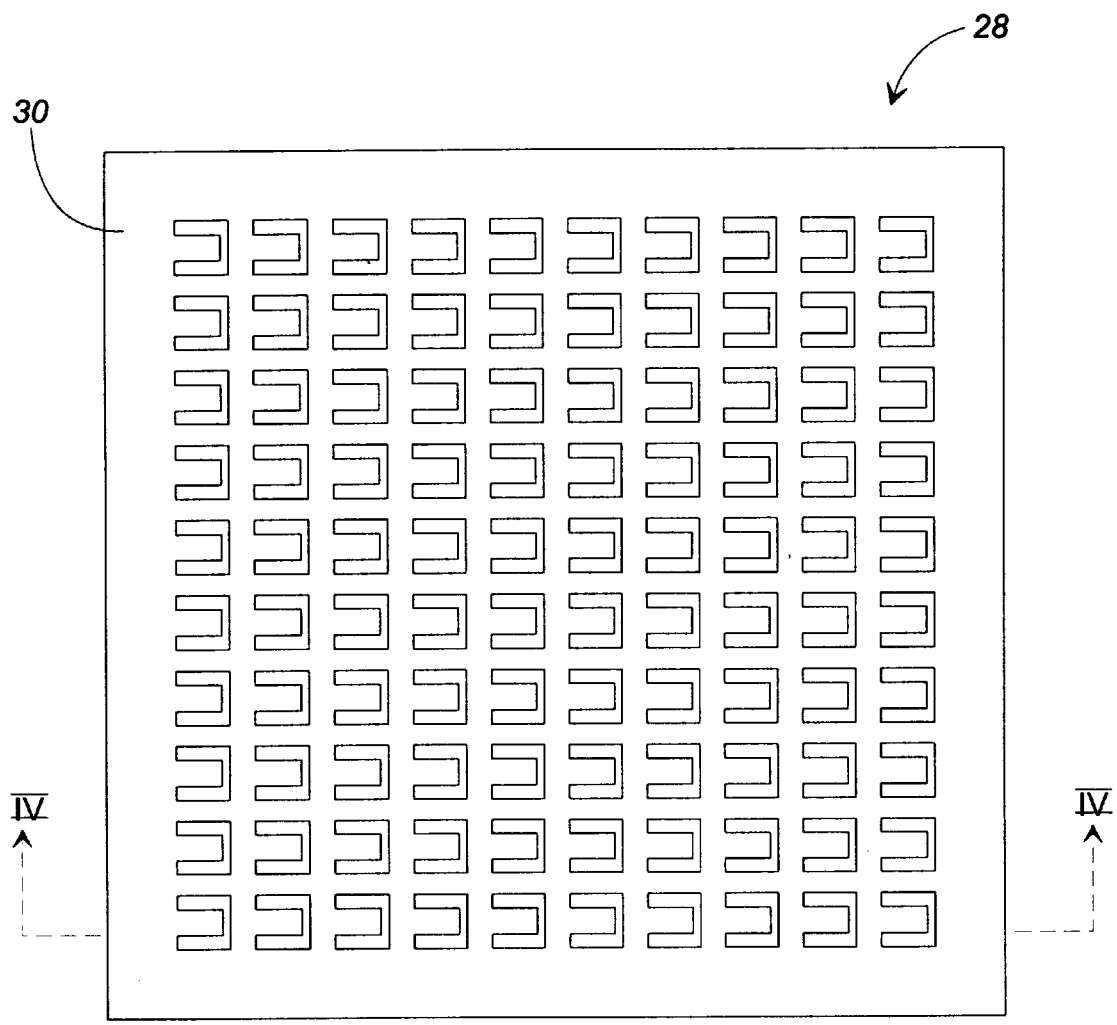
FIG. 3 is a plan view of a wafer containing an array of microcantilevers according to the present invention.
Figure 4:
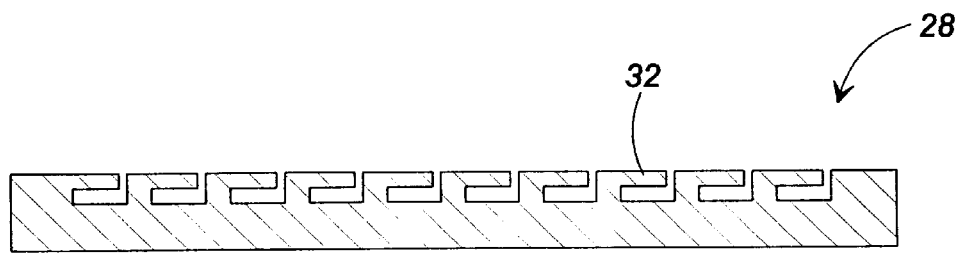
FIG. 4 is a vertical sectional view taken along the line IV—IV of FIG. 3.

For optical detection, coating these cantilevers with appropriate absorptive materials makes them bend when exposed to particular radiation (e.g., infrared, visible, or ultraviolet radiation). When the cantilever 20 is exposed to optical radiation, the temperature of the cantilever 20 increases due to absorption of radiation. The amount of cantilever bending is directly proportional in first order to the energy absorbed or to the intensity of radiation exposure. As shown in FIGS. 3 and 4, these infrared detectors can be manufactured on a single wafer 28 in a two dimensional array 30 of five-hundred or more microcantilevers 32. This arrangement provides spatial resolution comparable to current CCD detectors. One-hundred by one-hundred cantilever array or greater embodiments are contemplated.

Recent developments in scanning force microscopy (SFM) have created a great interest in micromachining extremely sensitive cantilevers. Microcantilevers that can respond to forces as small as a few picoNewtons have been designed for imaging soft materials. Microcantilevers with force constants as small as 0.008 Newtons per meter (N/m) are commercially available. Typical dimensions of commercially available microcantilevers are 100–200 $\mu$m long and 20–40 $\mu$m wide. Most of the commercially available microcantilevers are triangular in shape. However, rectangular cantilevers are also presently commercially available.

Microcantilevers can be designed with much smaller force constants by controlling the geometry of the cantilever. These microcantilevers can be micromachined using routine techniques from the semiconductor industry. Therefore, microcantilevers specifically optimized for radiation detection can be mass produced at very small cost.

Microcantilevers undergo bending due to differential stress (the bimetallic effect) on the cantilever. For cantilevers having thin film coatings, the bending, z, due to differential stress, $\Delta s$, can be approximated by $$z = (btl^2/4IY) \cdot \Delta s \quad (1)$$

where t is the cantilever thickness, l is the length, b is the width, I is the moment of inertia, $Y = E^*/(1-\upsilon)$, $\upsilon$ is Poisson's ratio, and $E^*=E_1E_2/(E_1+E_2)$ is the effective Young's modulus of the microcantilever ($E_1$ is Young's modulus for the substrate, $E_2$ is Young's modulus for the overlayer). This bending of the cantilever can be detected by optical techniques with sub-Angstrom sensitivity.

Silicon nitride microcantilevers with evaporated gold on one side undergo bending due to slight changes in temperature. This bending is due to the differential stress created by the differential thermal expansion of the silicon nitride and the gold overlayer. The differential stress due to thermal expansion of the materials can be written $$\Delta s \approx l(E_1\alpha_1 - E_2\alpha_2)\Delta T \quad (2)$$

where $\Delta T$ is the temperature change and $\alpha_1$ and $\alpha_2$ are coefficients of thermal expansion of the substrate and the overlayer materials, which form the bimetallic strip.

Therefore, by measuring the bending distance z, the change in temperature can be determined as, $$\Delta T \approx \frac{1}{3}[(t^2 Y) \cdot z]/[(l^3) \cdot (E_1\alpha_1 - E_2\alpha_2)] \quad (3)$$

where it is assumed that the temperature of the base and the cantilever are the same.

The bending of the cantilever can be detected with high sensitivity using detection techniques used in scanning force microscopy (SFM). A commercially available SFM device is able to detect cantilever bending with subnanometer sensitivity. It is possible to increase the sensitivity to sub-Angstrom levels by optimizing the detection system.

Small temperature changes can be measured using bimetallic bending of the cantilever. For a commercially available silicon nitride cantilever with evaporated gold on one side using a bending deflection z of 0.1 nm in Eq. (1), the lowest value of $\Delta T$ is $10^{-10}$ K. By optimizing cantilever variables (Eqs. (1) and (2)) the sensitivity of detection can be improved by several orders of magnitude.

The bending of the microcantilever can be determined by several means, including optical, capacitive, or piezoresistive methods. Due to the very light mass ($\sim 10^{-9}$ g) and hence low thermal mass of the microcantilever, thermal equilibrium occurs very quickly and response time can be in the microsecond range. The differential stress (Equation 4 above) of the microcantilever can also be determined by resonance techniques.

Figure 5:
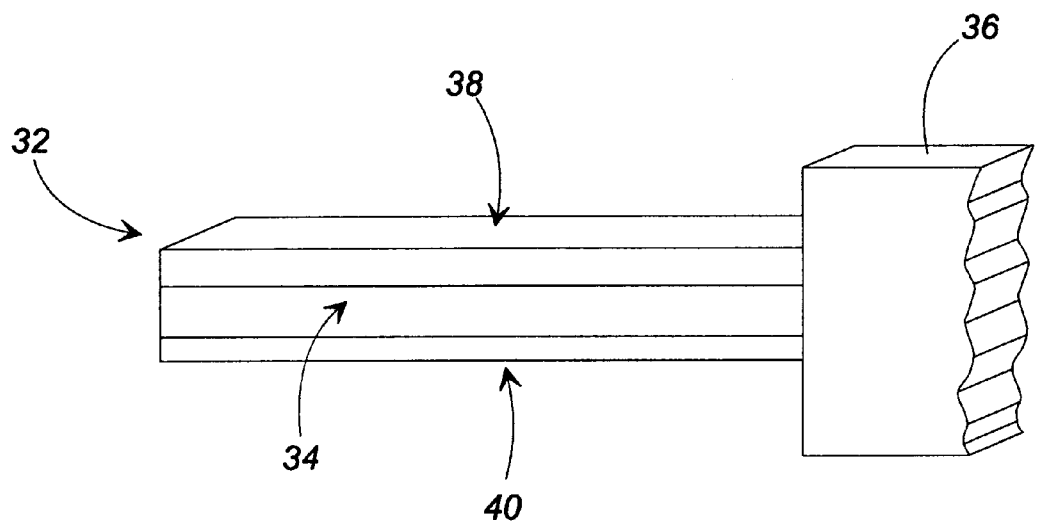
FIG. 5 is an enlarged perspective view of a radiation detector according to another embodiment of the present invention.
Figure 6:
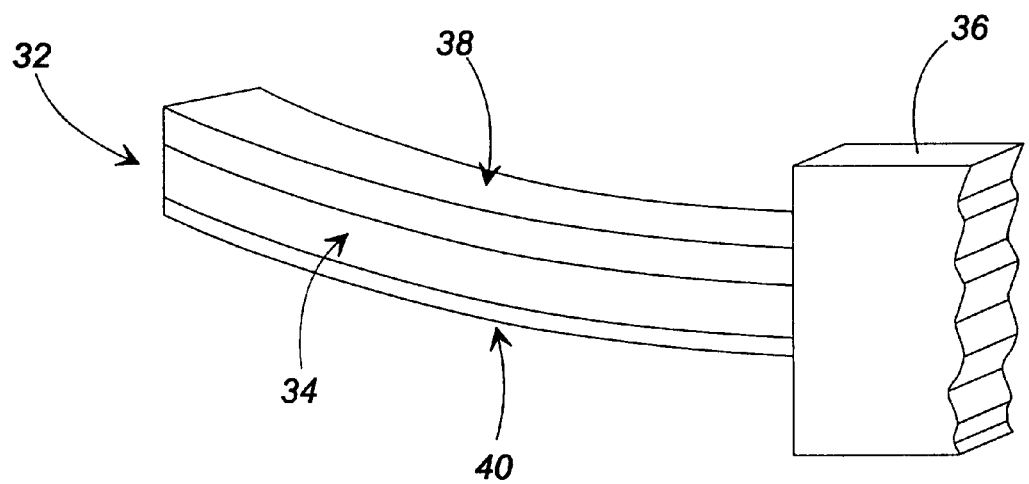
FIG. 6 is a perspective view of the cantilever depicted in FIG. 5 bending due to a radiation-induced change in the differential stress of the microcantilever.

Referring to FIGS. 5 and 6, a sensor 32 includes a microcantilever 34 supported by a base 36. A metallic coating 38 is formed on one surface of the microcantilever 34 and a stress-sensitive or thermally-sensitive coating 40 on the same surface or on another surface, as coating 38. The microcantilever 34 can be set into resonance by applying a mechanical oscillation to the base 36, as when the base is attached to a piezoelectric transducer. This type of sensor is shown on our prior U.S. Pat. No. 5,445,008, which is incorporated herein by reference.

As in the aforementioned patent, the base is driven by a variable frequency ac voltage to determine the resonance characteristics. Natural oscillatory stimulation from ambient acoustic or thermal excitation phenomena can also be used to determine these resonance characteristics. The cantilever having a stress-sensitive coating bends in response to a thermal input (as shown in FIG. 6) as stresses develop in the coating 40, which cause a variation in the effective spring constant of the cantilever 34. Such a variation in spring constant causes a change in resonance frequency, and the change in resonance can be correlated to a detected presence of radiation. Bending of the cantilever can now be precisely determined by such a variation in resonance frequency. If the selected stress-sensitive coating 40 is directly responsive to thermal input, changes in its spring constant will also translate into variation in resonance frequency.

Figure 7:
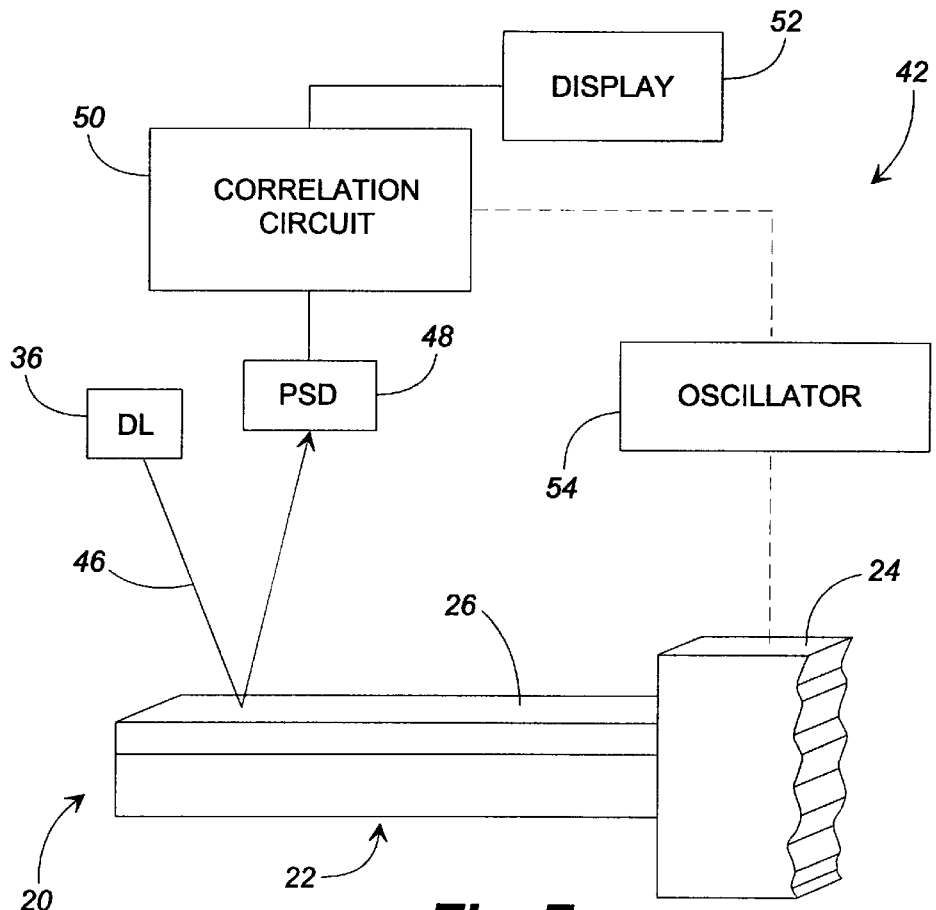
FIG. 7 is a schematic view for describing a cantilever disposed with respect to a laser diode and a position sensitive detector in an optical detection arrangement.

The resonance frequency as well as the magnitude and direction of bending of the cantilever can be determined electrically or optically. Referring to FIG. 7, an optical detector 42 incorporates the sensor 20 of FIG. 1, which includes a microcantilever 22, a base 24 and a coating 26. A diode laser (DL) 44 emits a laser beam 46 which is focused onto the free end of the microcantilever 22. The reflected beam is directed to a position sensitive detector (PSD) 48, which is operable to generate a position sensitive signal. The position sensitive signal from the PSD is related to the extent and direction of cantilever bending. The position sensitive signal from the PSD can also be used to determine the resonance frequency of the cantilever 20.

Means for correlating the PSD signal to a detected level and/or type of radiation is generally referred to in FIG. 7 as a correlation circuit 50. The detected value may be displayed in various forms by a display device 52 coupled to the correlation circuit 50. Also, if desired, an oscillator 54 can be coupled to the base 24, with a reference signal being delivered to the correlation circuit in a manner similar to that described in the aforementioned U.S. Pat. No. 5,445,008.

Figure 8:
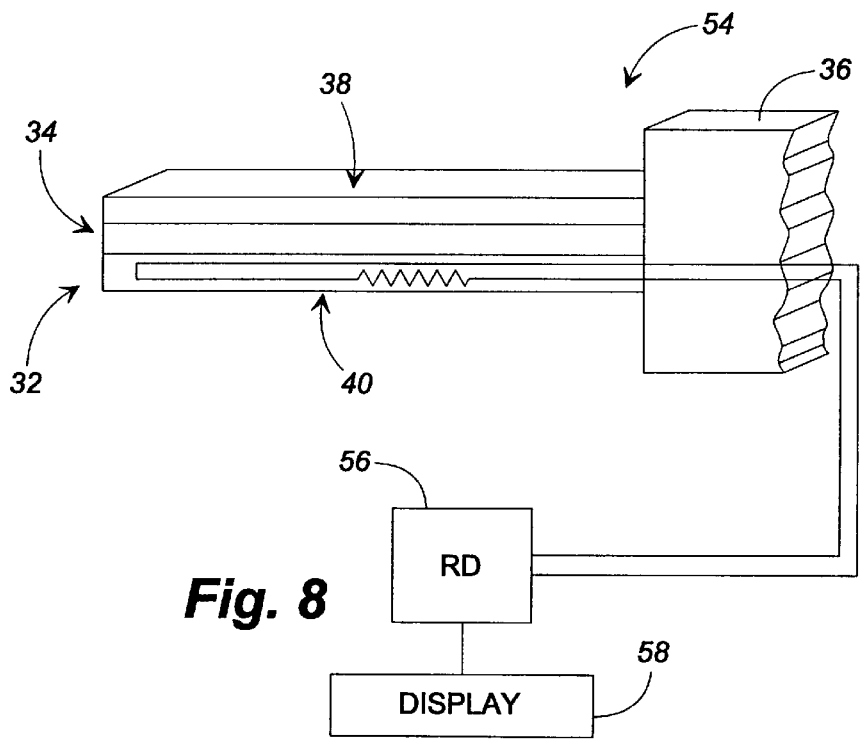
FIG. 8 is a schematic view for describing a cantilever with a piezoresistive coating coupled to a resistance detector in a piezoresistive detection arrangement.

Referring to FIG. 8, a radiation detector 55 uses the sensor 32 of FIG. 5, which includes a microcantilever 34, a base 36, and a metallic coating 38. A second coating 40 is made of a piezoresistive material, which enables the resonance frequency and bending of the microcantilever 34 to be determined electrically. This arrangement avoids the complexity of optical arrangements. The resistance of the piezoresistive coating 40 changes as the cantilever bends. A resistance detector (RD) 56 is operable to monitor the resistance and thereby determine the bending and resonance characteristics. For example, the resistance detector can provide a voltage signal which varies in accordance with microcantilever bending. The voltage signal can be displayed at a display 58, which can take any conventional form.

Figure 9:
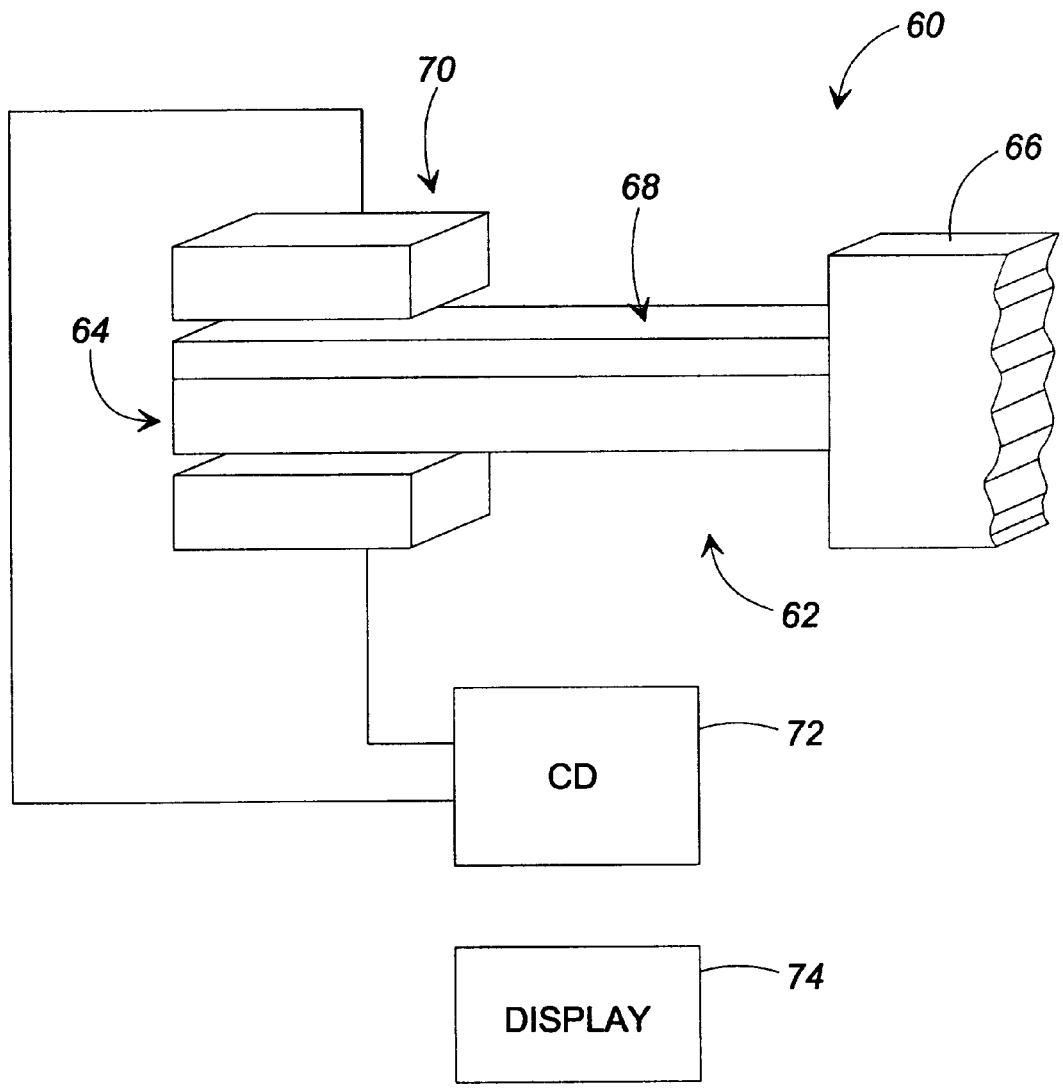
FIG. 9 is a schematic view for describing a cantilever disposed within a capacitor in a capacitive detection arrangement.

The bending, as well as the resonance frequency of the microcantilever can also be determined by a capacitive technique illustrated in FIG. 9. The radiation detector 60 includes a sensor 62 having a microcantilever 64 connected to a base 66 and a metallic coating 68 on the microcantilever. The microcantilever 64 is located inside a capacitor 70 having spaced apart plates. The bending and contorting microcantilever changes the capacitance of the capacitor 70 as it moves. The changing capacitance is detected by a capacitance detector (CD) 72 which can produce an electrical signal which varies in accordance with changes in capacitance. The signal can be delivered to a display device 74 which can be of any conventional type. In an alternate embodiment, the microcantilever could serve as one pole of the capacitor 70.

Figure 10:
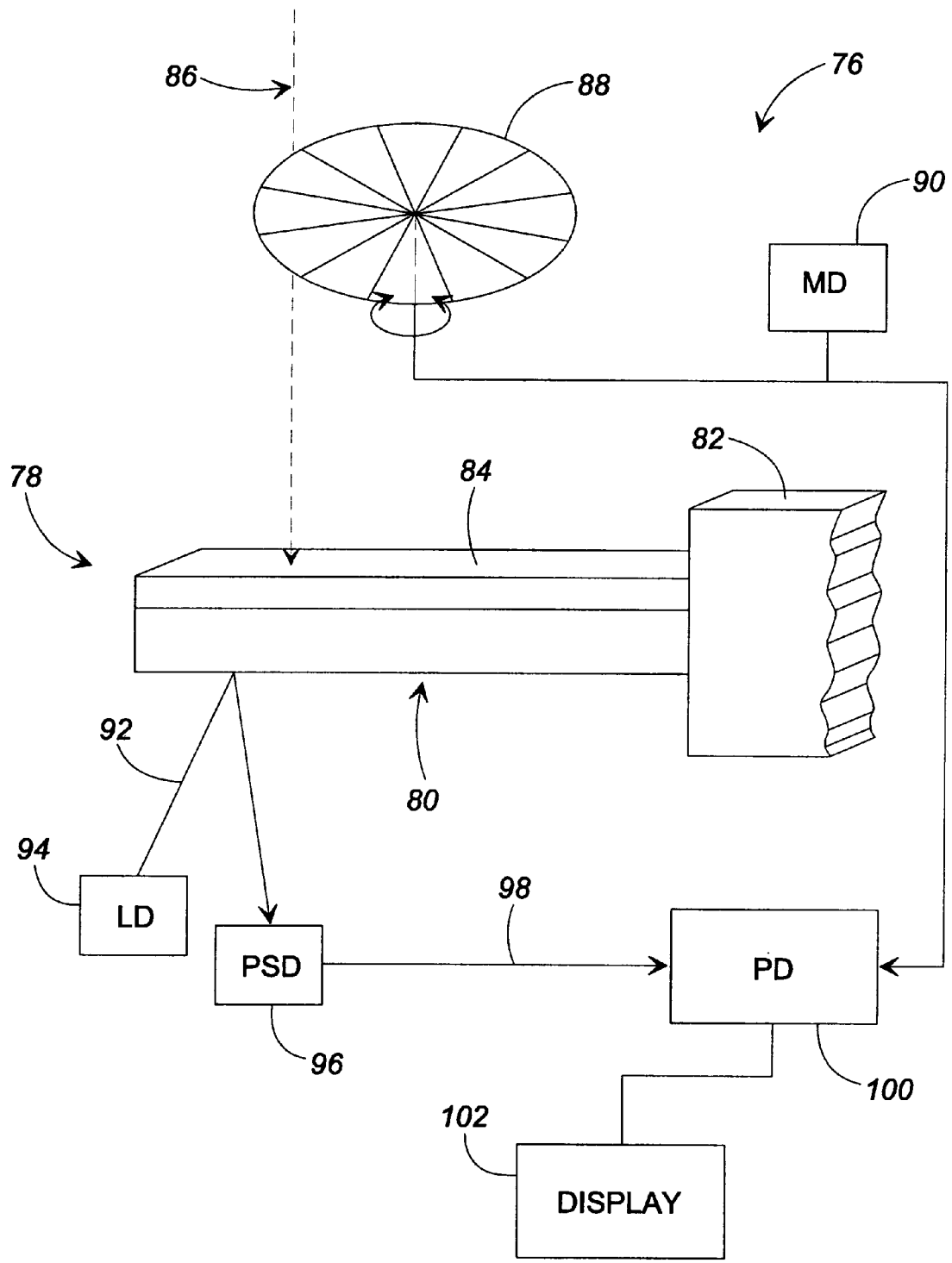
FIG. 10 is a schematic view for describing a cantilever disposed with respect to a laser diode, a position sensitive detector, and a modulator in a modulated detection arrangement.

Referring to FIG. 10, a radiation detector 76 includes a sensor 78 having a microcantilever 80 connected to a base 82 and a metallic coating 84. An optical input 86 impinging on the metallic coating 84 is modulated using a rotatable chopper or shutter 88. A modulator driver 90 rotates the modulator shutter (chopper) 88 by means of a drive signal.

A laser beam 92 is emitted by a laser diode (LD) 94 and is reflected from the microcantilever 80 as a cyclic reflection signal. The cyclic reflection signal is detected by a position sensitive detector (PSD) 96 which is responsive to generate a PSD signal 98. As the cyclic reflection signal sweeps back and forth across the PSD 96, it is modulated by bending movement of the microcantilever 80 in response to the impinging optical signal 86. The modulated PSD signal 98 is passed to a lock-in or phase detector (PD) 100 which can recover the modulated bending signal using the drive signal from the modulation driver 90 as a reference. The detected modulated bending signal can be used to detect the existence and intensity of an impinging optical signal. A display 102 can be used to display the detected radiation.

The embodiment depicted in FIG. 10 serves to eliminate drift from the detection system (optical, capacitive, piezoresistive, or other methods) or any other instrumental source. Such modulated detection is generally two to six orders of magnitude more stable than equivalent d.c. methods.

Figure 11:
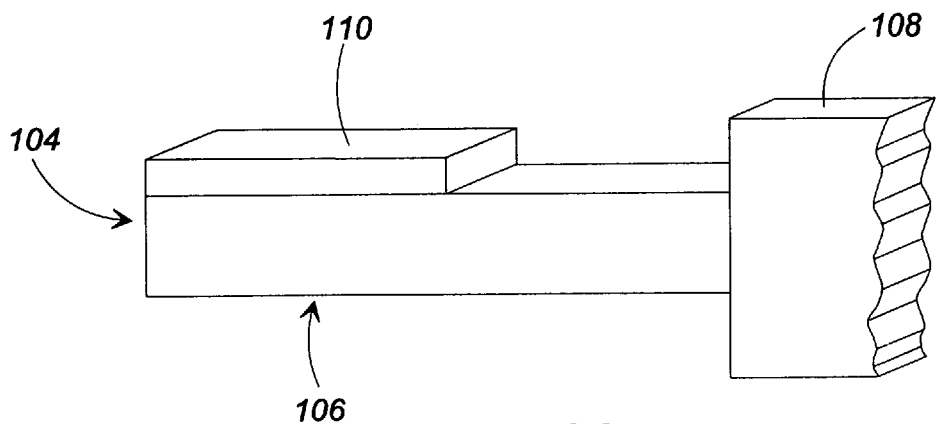
FIG. 11 is a perspective view for describing a cantilever presenting a partial metal film coating.

FIG. 11 illustrates another embodiment of a sensor 104 in which a microcantilever 106 is connected to a base 108. A partial metallic coating 110 is formed on the microcantilever 106. This embodiment provides further maximized sensitivity of individual sensor elements over coatings covering the length of the microcantilever. This approach isolates the bimetallic element 110 from the heat sink in the base 108, so that thermal energy is not lost into the base 108. Equilibration occurs when the extremely low mass bimetallic strip or coating 110 reaches thermal equilibrium, and all thermal energy is converted into thermal stress in the microcantilever 106.

Figure 12:
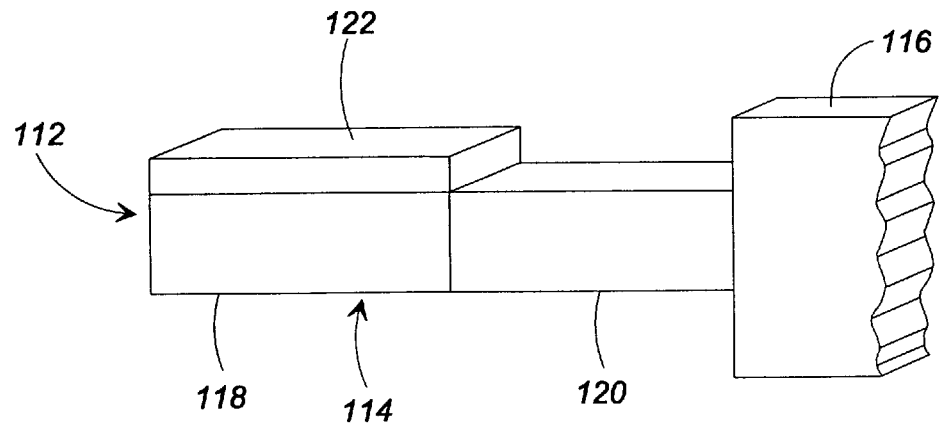
FIG. 12 is a perspective view for describing a cantilever coupled with a thermal insulator.

Referring to FIG. 12, an alternative embodiment for a sensor 112 includes a microcantilever 114 connected to a base 116 and having a distal section 118 and a proximal section 120. The proximal section 120 is made of a thermally insulative material. A metallic coating 122 is formed on the distal section 118. The thermally insulative material further reduces thermal loss into the base 116.

Figure 13:
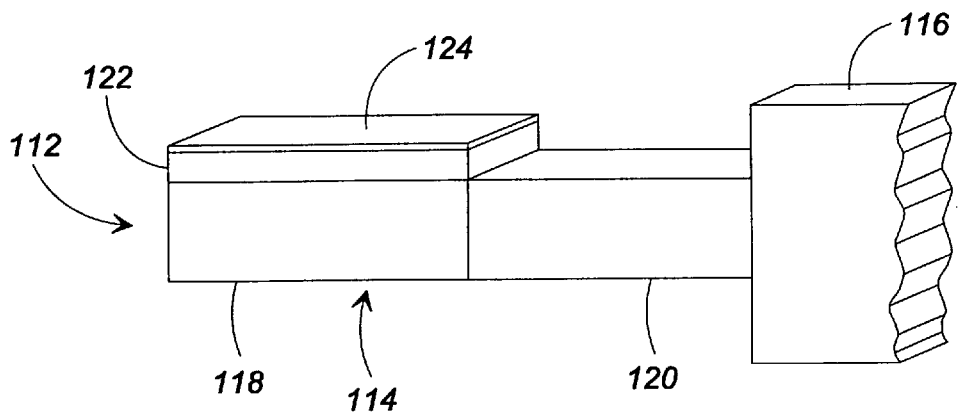
FIG. 13 is a perspective view for describing a cantilever with a thermally-absorptive coating.

FIG. 13 illustrates a variation of the embodiment of FIG. 12, in which a highly absorptive film or coating 124, such as gold black or Martin Marietta Black, is applied to the surface of the bimetallic coating 122 to increase $\eta$, the fraction of radiation flux absorbed. This coating could be applied to the metallic coatings of the other embodiments described herein.

In accordance with another specific embodiment of the invention, micromechanical detection of ultraviolet (UV) radiation at picoJoule(pJ) levels uses microcantilevers coated with a UV sensitive polymer. Significant advantages of such micromechanical detection include high sensitivity and miniature size. The technique can be embodied to detect radiation in other spectral regions by appropriate coating and design of cantilevers. An array of cantilevers with different sensitivities can be used as a compact, broad-range detector. Sensitivity to light can be controlled by adjusting the geometry and coating of the cantilevers. For example, a variety of photoresist materials can be used to achieve different sensitivities under a range of exposure conditions. An important application of this technique is for real-time characterization of photosensitive polymers used in integrated circuit fabrication.

Commercially available "V"-shaped (cross-section) silicon cantilevers (180-$\mu$m base to apex length) with a nominal effective spring constant of 0.06-N/m (Ultravers, from Park Scientific Instruments, Inc.) were used in tests exemplified herein. The cantilevers were coated with a thin layer of optical adhesive, Norland 61 (Norland, New Brunswick, N.J.). Norland 61 is a clear, liquid, mercaptan-ester-based polymer that cures when exposed to UV light. A two-step curing process is generally used, comprising a short UV precure to set the material, followed by a longer UV cure to achieve full crosslinking. The maximum absorption is specified by the manufacturer to lie within the range of 354–378 nm.

Coating was achieved by placing a drop of the adhesive solution on a clean glass slide and sliding the cantilever into the droplet. Once the cantilevers were wetted, they were withdrawn from the droplet and allowed to air dry for two weeks in a covered Petri dish kept in the dark.

The deflection and resonance frequency of the microcantilevers were measured using a Multi-Mode Nanoscope III (Digital Instruments, Inc., Santa Barbara, Calif.) with the cantilevers positioned far away from any surfaces to avoid tip-surface interactions. Cantilevers were exposed to UV under ambient humidity and temperature. The UV source, a pencil-style mercury calibration lamp (Jelight Co., Laguna, Calif.), was placed directly below the cantilever at distances from 1 to 10 cm. Radiant intensity at 1 cm was estimated to be 0.2 mW/cm$^2$ for the mercury line at 365 nm. Cantilever deflection was measured by monitoring the normalized error voltage between the top and bottom segment of a dual element position sensitive detector ($V_{error}$=[A−B]/[A+B]).

Deflection due to heating (from absorption of the Nanoscope diode laser light) is negligible for such a polymer-coated cantilever. The shift of cantilever resonance frequency due to exposure to UV light was observed by sweeping the excitation frequency of a piezoelectric element to which the cantilever was mounted.

The resonance frequency, $\upsilon$, of a microcantilever can be described by $$\nu = (1/2\pi)\sqrt{(k/m^*)} \tag{4}$$

where the effective mass m* of the "V"-shaped cantilever is 0.18 $m_b$, $m_b$ is the mass of the cantilever, and k is the effective spring constant. Under conditions of negligible damping, such as when the cantilever is oscillating freely in air, the resonance frequency is equal to the frequency of maximum oscillatory amplitude. The amount of polymer deposited on the surface was calculated from the change in resonance frequency before and after coating.

The resonance frequency of microcantilevers coated with photo cured polymer shifts dramatically when exposed to ultraviolet (UV) radiation. The magnitude and rate of this shift are dependent upon the power of the UV source and the distance between the source and the cantilever.

Figure 14:
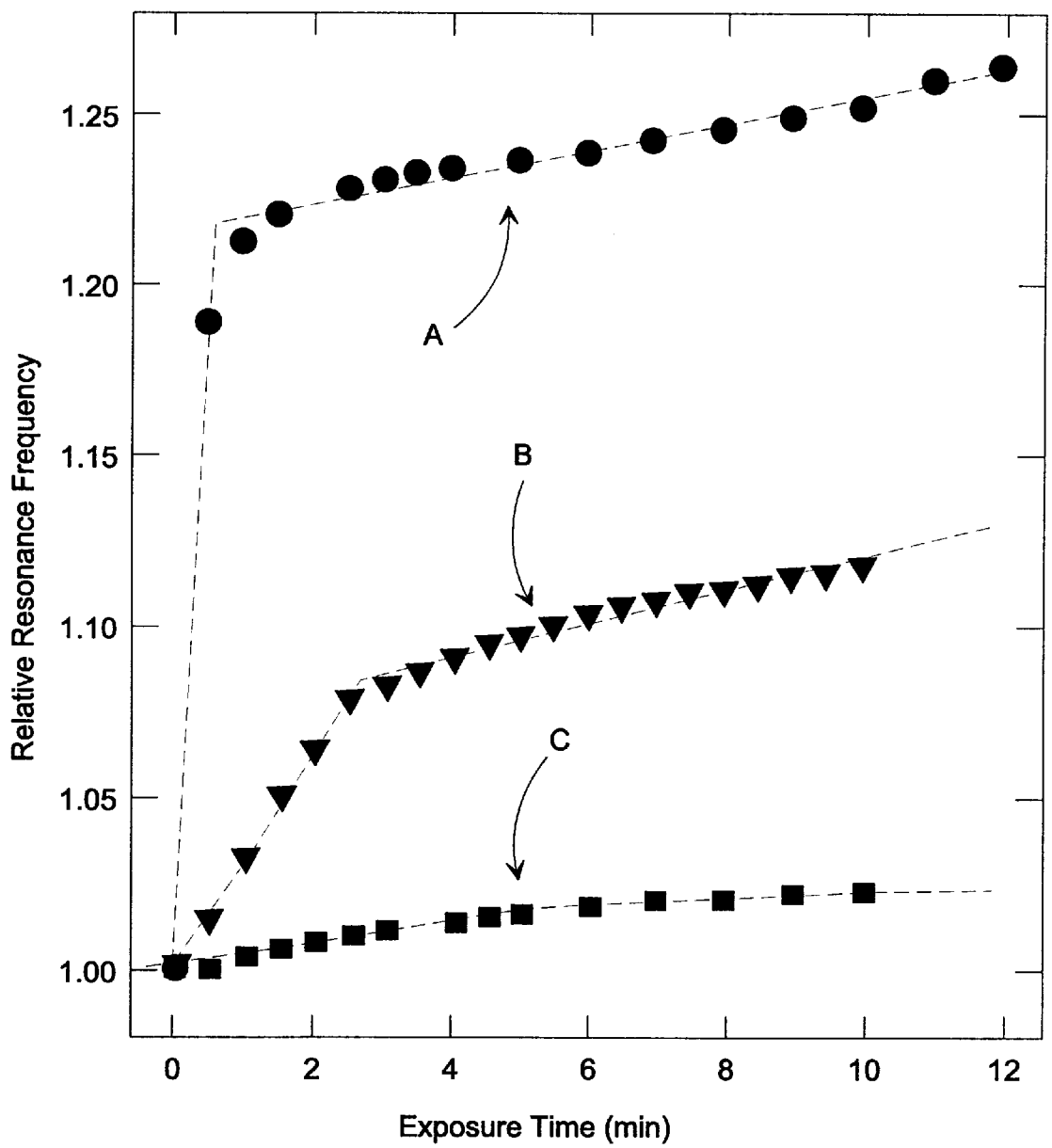
FIG. 14 is a graph for describing shifting of relative resonance as a function of ultraviolet exposure for a cantilever coated with an optically sensitive material according to an embodiment of the invention.

FIG. 14 depicts the relative shift of resonance frequency ($\nu/\nu_0$) as a function of UV exposure time for a cantilever coated with Norland 61 optical adhesive for several exposure conditions. Distances between the UV-source and the cantilever are 1.0 cm (top curve "A"), 7.8 cm (middle curve "B"), and 10.0 cm (bottom curve "C"). Each curve in FIG. 14 shows two distinct regions, a rapid change in resonance frequency in a beginning region and a distinctly slower rate of change in a later region. For an exposure 1.0 cm from the UV source, the initial slope corresponds to a photometric sensitivity of approximately 100 pJ/Hz.

Figure 15:
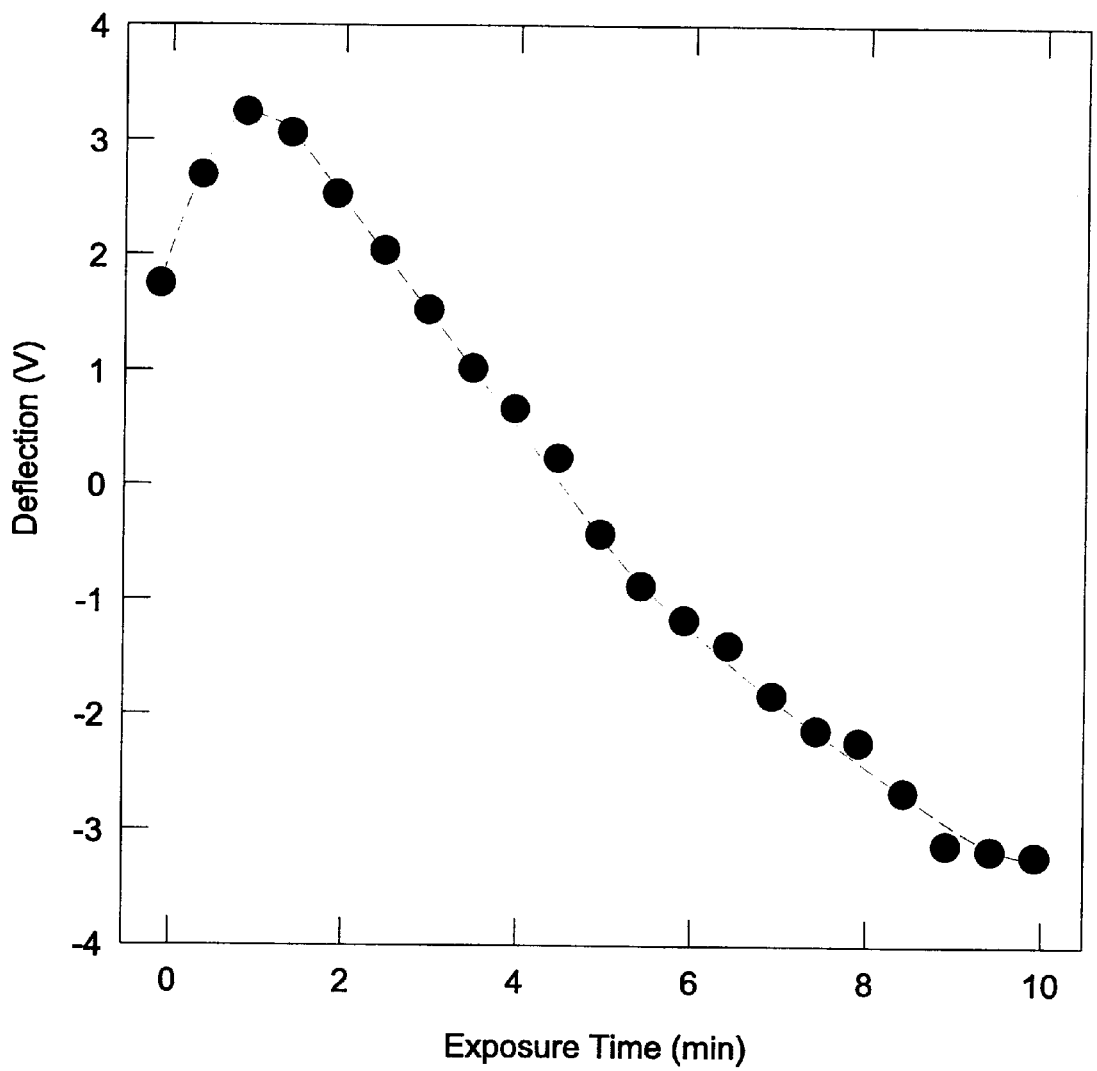
FIG. 15 is a graph for describing cantilever deflection as a function of ultraviolet exposure for a cantilever described with respect to FIG. 14.

In addition to resonance frequency, static deflection (bending) of the cantilever was also found to change with UV exposure, as shown by the curve in FIG. 15.

The frequency response shown in FIG. 14 and the static deflection response shown in FIG. 15 were taken simultaneously on the same cantilever (at 7.8 cm from the UV source). For all cantilevers tested, static deflection data also exhibited two distinct regions.

The shift in resonance frequency of these cantilevers upon exposure to UV radiation is due to changes in spring constant resulting from UV initiated crosslinking of the polymer coating. The two regions observed may be attributed to the rapid precure process (steep initial slope in response to UV exposure) followed by the slower final crosslinking step (shallow secondary slope).

The slopes of the initial region for the different levels of UV exposure follow the general trend expected for a $1/d^2$ decrease in UV intensity as the distance, d, between the source and the cantilever is increased. However, the total relative frequency shift at the transition between precure and cure steps decreases with decreasing UV intensity, indicating that the coatings do not achieve the same ultimate rigidity. This may be the result of differences in degree of crystallinity for polymer films undergoing shorter or longer periods of stretching during the curing process.

Surface stress changes as a result of crosslinking produce bending of the cantilever due to UV exposure. An inflection in the curve shown in FIG. 15 occurs at an exposure time of approximately 1.2 minutes, while a break in the corresponding curing curve (C in FIG. 14) occurs at 2.7 minutes. The direction of initial deflection is consistent with swelling of the polymer film attributable to exothermic expansion from rapid chemical reaction during precuring. As thermal equilibrium is reached and the rate of reaction begins to slow, the direction of deflection reverses as the polymer density increases due to crosslinking.

The resonance frequency did not stop changing when the UV light was turned off, but continued to change for approximately one minute, perhaps due to slow completion of UV initiated changes in the polymer coating.

This specific embodiment provides an effective means for achieving integrated measurement of radiation based on changes in resonance and bending of coated microcantilevers. As a further specific embodiment of the invention, microcantilevers that are fabricated from materials responsive to impinging nuclear radiation can be used to detect nuclear radiation based on changes in the mechanical properties of the microcantilever. Referring to FIG. 1, this response results from radiation-induced damage in the material which constitutes the microcantilever or in an applied coating 26 on the microcantilever 22. Sensitive materials can include various polymeric chemicals and solid state materials that absorb nuclear radiation, such as crystalline silicon. Contributions of the invention can thus be used to construct extremely small, inexpensive, and very sensitive micromechanical radiation dosimeters.

If a polymer coating material-or other coating material offering reversible response to radiation exposure was used, then reversible sensor response could also be achieved.

An array of cantilevers coated with differing polymers or other materials can be used to detect a wide range of radiant energies and intensities.

Other monitoring approaches can be used to eliminate potential interference from the optical transducer system, such as capacitive or piezoresistive sensing. In addition to photometric applications, coatings sensitive to electrons or ions could be used to probe microchemical or physical phenomena.

Embodiments of the invention could also be used to study the curing dynamics of photosensitive polymers, where the small size of the sensor makes it especially attractive for profiling localized effects during semiconductor processing.

There are numerous advantages provided by the invention: bending and resonance frequency changes are inherently simple to detect, and the devices can be manufactured in arrays using conventional semiconductor methods. The present invention provides a much faster response time than conventional thermopile detectors. The sensitivity afforded by embodiments of the invention can be controlled by the geometry of the microcantilevers and coatings applied to the microcantilevers, which can affect broadband, narrow band, low pass, or high pass response.

With current micro-manufacturing technologies, an entire sensor embodiment is able to fit in a volume less than 100 $\mu$m on a side. A sensor array and control electronics can be housed in a standard transistor package. The power requirement is estimated to be in the sub-mW range for individual sensors, which can be delivered by battery or photovoltaic means.

Wide ranges of the electromagnetic spectrum can be detected using a sensor array arrangement. Specific absorptive coatings enable selective sensitivity in specific wavelength bands; similar selectivity is possible with appropriate material selection for various nuclear particles and radiation.

Other applications of the invention include infrared radiation detection, satellite imagery, aerial surveillance, night vision, collision avoidance, ultraviolet detection, remote and micro-scale temperature measurements.

While several particular forms of the invention have been illustrated and described, it will be apparent that various modifications can be made without departing from the spirit and scope of the invention.

What is claimed is:

1. An apparatus for imaging at least one of electromagnetic radiation in the optical range and nuclear radiation, comprising:

a plurality of micromechanical sensors having an element exposed to a source of at least one of electromagnetic radiation in the optical range and nuclear radiation, each of said plurality of sensors having at least one physical property affected by said at least one of the electromagnetic radiation in the optical range and nuclear radiation, and said plurality of sensors being arranged in a two-dimensional matrix;

means for monitoring changes induced by said at least one of electromagnetic radiation in the optical range and nuclear radiation in the at least one physical property of each of said plurality of sensors; and means for correlating changes in the at least one physical property to a measure of the said at least one of electromagnetic radiation in the optical range and nuclear radiation.

2. The apparatus of claim 1, wherein said means for monitoring changes induced by said at least one of electromagnetic radiation in the optical range and nuclear radiation in the at least one physical property of each of said plurality of sensors comprises means for monitoring changes selected from the group consisting of a bending of each of said microcantilevers, a shift in resonance frequency of each of said microcantilevers, and a combination thereof.

3. An apparatus according to claim 1, wherein said plurality of micromechanical sensors comprises a plurality of microcantilevers each of which is connected to a base, where each of said microcantilevers consists of a material or layered materials which converts energy of radiation, if present, into a physical change in the microcantilever.

4. An apparatus according to claim 3, wherein each of said microcantilevers is comprised of at least one coating, where the at least one coating includes a first metallic coating which together with each of said microcantilevers, exhibits a bimetallic effect when exposed to energy of radiation.

5. An apparatus according to claim 4, wherein the first metallic coating covers a portion of one surface of each of said microcantilevers and is separated from the base by a space.

6. An apparatus according to claim 4, wherein the first metallic coating covers a portion of one surface of each of said microcantilevers and is separated from the base by an insulator.

7. An apparatus according to claim 3, further comprising a second coating on each of said microcantilevers, consisting of a radiation absorbing material that increases the radiation flux absorbed by each of said microcantilevers.

8. An apparatus according to claim 3, wherein each of said microcantilevers or layered material on each of said microcantilevers exhibits a change in chemical or physical properties upon absorption of radiation.

9. An imaging array for electromagnetic or nuclear radiation detection comprising:

a two dimensional array of micromechanical sensors formed on a single wafer.

10. The imaging array of claim 9, further comprising transduction means for detecting changes in said micromechanical sensors resulting from exposure to electromagnetic or nuclear radiation.

11. The imaging array of claim 10, wherein said transduction means comprises means for detecting bending in said micromechanical sensors resulting from exposure to electromagnetic or nuclear radiation.

12. The imaging array of claim 10, wherein said transduction means comprises means for detecting resonance frequency shifts in said micromechanical sensors resulting from exposure to electromagnetic or nuclear radiation.

13. The imaging array of claim 10, further comprising means for transforming a detected change into an output signal.

14. The imaging array of claim 13, wherein said means for transforming a detected change into an output signal comprises an optical means.

15. The imaging array of claim 13, wherein said means for transforming a detected change into an output signal comprises a capacitive means.

16. The imaging array of claim 13, wherein said means for transforming a detected change into an output signal comprises an electron tunneling means.

17. The imaging array of claim 13, wherein said means for transforming a detected change into an output signal comprises a piezoelectric means.

18. The imaging array of claim 13, wherein said means for transforming a detected change into an output signal comprises a piezoresistive means.

19. A method for imaging electromagnetic or nuclear radiation, comprising the steps of:

exposing a two dimensional array of micromechanical sensors formed on a single wafer to electromagnetic or nuclear radiation;

detecting changes in said micromechanical sensors resulting from said exposure to electromagnetic or nuclear radiation; and transforming said detected changes into output signals.

20. The method of claim 19, wherein said step of detecting changes in said micromechanical sensors resulting from said exposure to electromagnetic or nuclear radiation comprises the step of detecting bending in said micromechanical sensors.

21. The method of claim 19, wherein said step of detecting changes in said micromechanical sensors resulting from said exposure to electromagnetic or nuclear radiation comprises the step of detecting resonance frequency shifts in said micromechanical sensors.

22. The method of claim 19, wherein said step of transforming said detected changes into output signals comprises the step of transforming said detected changes into output signals using optical means.

23. The method of claim 19, wherein said step of transforming said detected changes into output signals comprises the step of transforming said detected changes into output signals using capacitive means.

24. The method of claim 19, wherein said step of transforming said detected changes into output signals comprises the step of transforming said detected changes into output signals using electron tunneling means.

25. The method of claim 19, wherein said step of transforming said detected changes into output signals comprises the step of transforming said detected changes into output signals using piezoelectric means.

26. The method of claim 19, wherein said step of transforming said detected changes into output signals comprises the step of transforming said detected changes into output signals using piezoresistive means.

27. An apparatus for detecting nuclear radiation, comprising:

a radiation sensor having an element exposed to a source of radiation, the sensor having at least one physical property affected by radiation;

means for monitoring radiation-induced changes in the at least one physical property of the sensor; and means for correlating changes in the at least one physical property to a measure of radiation; wherein the sensor comprises a microcantilever connected to a base, where the microcantilever consists of a material or layered materials which converts energy of radiation, if present, into a physical change in the microcantilever; wherein the microcantilever or layered materials on the microcantilever exhibits a change in elastic modulus upon radiation damage induced by absorption of nuclear radiation.

* * * * *

(12) EX PARTE REEXAMINATION CERTIFICATE (6959th)
United States Patent
Thundat et al.

(10) Number: US 6,118,124 C1
(45) Certificate Issued: Jul. 28, 2009

(54) ELECTROMAGNETIC AND NUCLEAR RADIATION DETECTOR USING MICROMECHANICAL SENSORS

(75) Inventors: Thomas G. Thundat, Knoxville, TN (US); Robert J. Warmack, Knoxville, TN (US); Eric A. Wachter, Oak Ridge, TN (US)

(73) Assignee: UT-Battelle, LLC

Reexamination Request:
No. 90/007,692, Aug. 24, 2005

Reexamination Certificate for:
Patent No.: 6,118,124
Issued: Sep. 12, 2000
Appl. No.: 08/588,484
Filed: Jan. 18, 1996

(51) Int. Cl.
*G01J 5/10* (2006.01)
*G01J 5/00* (2006.01)
*G01J 1/04* (2006.01)
*B81B 3/00* (2006.01)

(52) U.S. Cl. .................................. 250/332; 250/338.1
(58) Field of Classification Search ................. None
See application file for complete search history.

(56) References Cited

U.S. PATENT DOCUMENTS

| | | | |
|---|---|---|---|
| 3,896,309 A | 7/1975 | Halsor et al. | |
| 4,900,367 A | 2/1990 | Gergis | |
| 5,021,663 A | 6/1991 | Hornbeck | |
| 5,541,412 A | 7/1996 | Tanaka et al. | |
| 5,559,358 A | 9/1996 | Burns et al. | |

FOREIGN PATENT DOCUMENTS

WO  WO 95/02170  1/1995

OTHER PUBLICATIONS

Jones, "The Detection of Thermal Radiation Using Linear Expansion," Proc. Royal Society of London, Series A, vol. 249, No. 1256 (Jan. 1, 1959), 100–113.

Jones et al., "Recording Optical Lever," J. Scientific Instruments, vol. 36 (Feb. 1959), 90–94.

Riethmuler et al., "Thermally Excited Silicon Microactuators," IEEE Transactions on Electron Devices, vol. 35, No. 6 (Jun. 1988), 758–763.

Kenny et al., "Micromachined Electron Tunneling Infrared Sensors," IEEE (1992), 174–177.

Chu et al., "Analysis of Tip Deflection and Force of a Bimetallic Cantilever Microactuator," J. Micromech. Microeng., vol. 3 (1993), 4–7.

Thundat et al., "Thermal and Ambient–Induced Deflections of Scanning Force Microscope Cantilevers," Appl. Phys. Lett., vol. 64, No. 21 (May 23, 1994), 2894–2896.

Thundat et al., "Micromechanical Radiation Dosimeter," Appl. Phys. Lett., vol. 66, No. 12 (Mar. 20, 1995), 1563–1565.

J.K. Gimzewski et al., Observation of a chemical reaction using a micromechanical sensor, Chemical Physics Letters, Jan. 28, 1994, pp. 589–594, vol. 217, No. 5.6.

E.H. Putley, Thermal Detectors, Optical and Infrared Detectors, 1977, pp. 71–100, R.J. Keyes ed.

*Primary Examiner*—Sharon E Payne

(57) ABSTRACT

Electromagnetic and nuclear radiation is detected by micromechanical sensors that can be coated with various interactive materials. As the micromechanical sensors absorb radiation, the sensors bend and/or undergo a shift in resonance characteristics. The bending and resonance changes are detected with high sensitivity by any of several detection methods including optical, capacitive, and piezoresistive methods. Wide bands of the electromagnetic spectrum can be imaged with picoJoule sensitivity, and specific absorptive coatings can be used for selective sensitivity in specific wavelength bands. Microcantilevers coated with optical cross-linking polymers are useful as integrating optical radiation dosimeters. Nuclear radiation dosimetry is possible by fabricating cantilevers from materials that are sensitive to various nuclear particles or radiation. Upon exposure to radiation, the cantilever bends due to stress and its resonance frequency shifts due to changes in elastic properties, based on cantilever shape and properties of the coating.

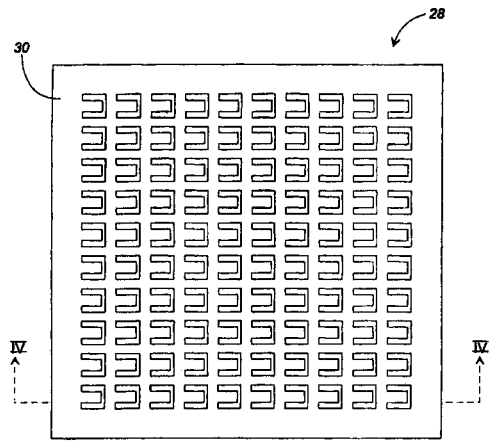

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3, 4 and 6 are cancelled.

Claims 1, 5, 7–9 and 19 are determined to be patentable as amended.

Claims 2, 10–18 and 20–27, dependent on an amended claim, are determined to be patentable.

New claims 28–30 are added and determined to be patentable.

1. An apparatus for imaging at least one of electromagnetic radiation in the optical range and nuclear radiation, comprising:
   a plurality of micromechanical sensors having an element exposed to a source of at least one of electromagnetic radiation in the optical range and nuclear radiation, each of said plurality of sensors having at least one physical property affected by said at least one of the electromagnetic radiation in the optical range and nuclear radiation, and said plurality of sensors being arranged in a two-dimensional matrix;
   means for monitoring changes induced by said at least one of electromagnetic radiation in the optical range and nuclear radiation in the at least one physical property of each of said plurality of sensors; and
   means for correlating changes in the at least one physical property to a measure of the said at least one of electromagnetic radiation in the optical range and nuclear radiation;
   *wherein said plurality of micromechanical sensors comprises a plurality of microcantilevers each of which is connected to a base, and wherein each of said microcantilevers comprises a material which converts energy of radiation, if present, into a physical change in the microcantilever;*
   *wherein each of said microcantilevers is comprised of at least one coating, wherein the at least one coating includes a first metallic coating which, together with each of said microcantilevers, exhibits a bimetallic effect when exposed to energy of radiation; and*
   *wherein the first metallic coating covers a portion of one surface of each of said microcantilevers and is separated from the base by an insulator.*

5. An apparatus according to claim [4] *1*, wherein the first metallic coating covers a portion of one surface of each of said microcantilevers and is separated from the base by a space.

7. An apparatus according to claim [3] *1*, further comprising a second coating on each of said microcantilevers, consisting of a radiation absorbing material that increases the radiation flux absorbed by each of said microcantilvers.

8. An apparatus according to claim [3] *1*, wherein each of said microcantilevers or layered material on each of said microcantilevers exhibits a change in chemical or physical properties upon absorption of radiation.

9. An imaging array for electromagnetic or nuclear radiation detection comprising:
   a two dimensional array of micromechanical sensors formed on a single wafer,
   *wherein each of said micromechanical sensors comprises a microcantilever connected to a base, and wherein each of said microcantilevers comprises a material which converts energy of radiation, if present, into a physical change in the microcantilever;*
   *wherein each of said microcantilevers is comprised of at least one coating, wherein the at least one coating includes a first metallic coating which, together with each of said microcantilevers, exhibits a bimetallic effect when exposed to energy of radiation; and*
   *wherein the first metallic coating covers a portion of one surface of each of said microcantilevers and is separated from the base by an insulator.*

19. A method for imaging electromagnetic or nuclear radiation, comprising the steps of:
   [exposing] *providing* a two dimensional array of micromechanical sensors formed on a single wafer [to electromagnetic or nuclear radiation], *wherein each of said micromechanical sensors comprises a microcantilever connected to a base, and wherein each of said microcantilevers comprises a material which converts energy of radiation, if present, into a physical change in the microcantilever, wherein each of said microcantilevers is comprised of at least one coating, wherein the at least one coating includes a first metallic coating which, together with each of said microcantilevers, exhibits a bimetallic effect when exposed to energy of radiation, and wherein the first metallic coating covers a portion of one surface of each of said microcantilevers and is separated from the base by an insulator;*
   *exposing said two dimensional array of micromechanical sensors to electromagnetic or nuclear radiation;*
   detecting changes in said micromechanical sensors resulting from said exposure to electromagnetic or nuclear radiation; and
   transforming said detected changes into output signals.

*28. The apparatus of claim 1, wherein said insulator comprises a thermal insulator.*

*29. The apparatus of claim 9, wherein said insulator comprises a thermal insulator.*

*30. The apparatus of claim 19, wherein said insulator comprises a thermal insulator.*

* * * * *